United States Patent [19]

Hubbard

[11] 4,304,519
[45] Dec. 8, 1981

[54] TOWING VEHICLE WITH SIDE LIFTER

[76] Inventor: John S. Hubbard, R.R. 1, Box 36, Parker City, Ind. 47368

[21] Appl. No.: 89,183

[22] Filed: Oct. 29, 1979

[51] Int. Cl.³ .............................................. B60P 3/06
[52] U.S. Cl. .................................. 414/563; 414/547; 212/231; 212/236; 212/189
[58] Field of Search ...................... 414/546, 547, 563; 212/231, 236, 238, 189; 254/325

[56] References Cited

U.S. PATENT DOCUMENTS

| | | | |
|---|---|---|---|
| 1,906,532 | 5/1933 | Beuhler et al. | 212/189 X |
| 2,601,927 | 7/1952 | Frenzel | 212/236 X |
| 2,928,557 | 3/1960 | Cline | 414/563 X |
| 2,951,596 | 9/1960 | Winder et al. | 212/236 |
| 3,045,836 | 7/1962 | Evans | 212/238 |
| 3,468,439 | 9/1969 | Olitsky et al. | 414/547 X |
| 3,842,983 | 10/1974 | Dolza | 212/236 |

*Primary Examiner*—Robert W. Saifer
*Attorney, Agent, or Firm*—Woodard, Weikart, Emhardt & Naughton

[57] ABSTRACT

A towing vehicle with a boom pivotal about a horizontal axis and a second axis perpendicularly thereto enabling the boom to be moved to a position over a disabled vehicle located along side the towing vehicle. A pair of power cylinders is attached to the boom and is operable to swing the boom with load attached to locate the load or disabled vehicle immediately behind the towing vehicle. An elongated support is movable downwardly against the ground behind the towing vehicle to provide stability as the load is lifted and swung from a position aside the towing vehicle to a rearward position.

6 Claims, 7 Drawing Figures

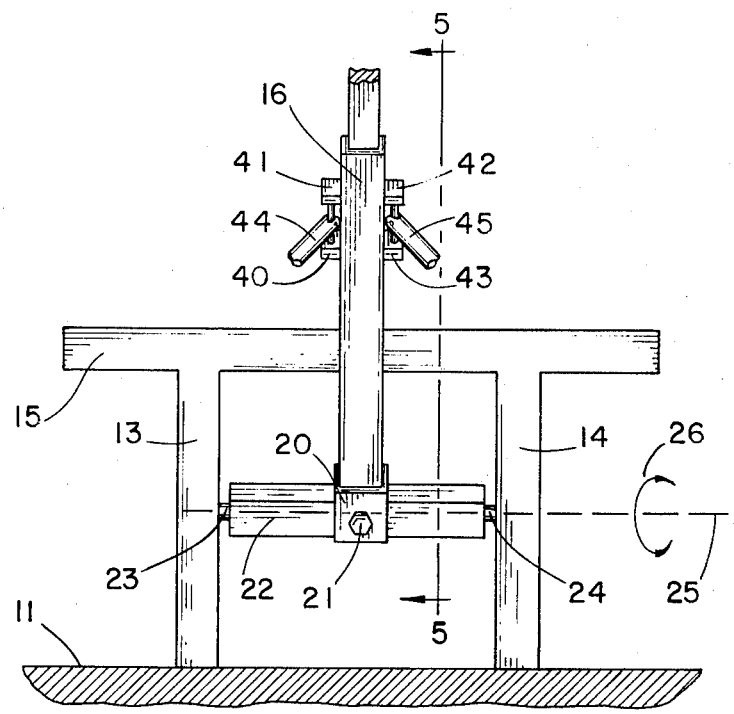
FIG. 4.
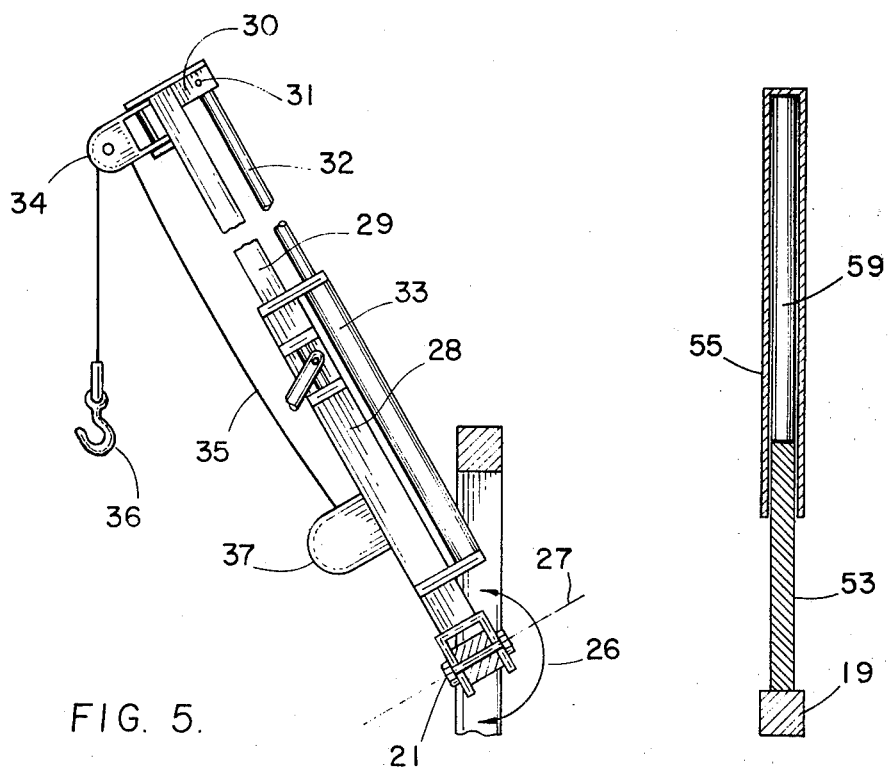
FIG. 5.
FIG. 6.

TOWING VEHICLE WITH SIDE LIFTER

BACKGROUND OF THE INVENTION

This invention is in the field of towing vehicles or wreckers for towing disabled vehicles including cars and trucks. In my U.S. Pat. No. 3,322,396, I disclose a towing vehicle in which there is a greater distribution of the weight of the load between the front and rear axles of the towing vehicle, thereby effecting greater stability for the towing vehicle and at the same time substantially increasing its load-carrying capability. My prior towing vehicle is designed so as to allow connection of the towing vehicle with a disabled vehicle located immediately therebehind. Disclosed herein is a towing vehicle which will allow the operator to initially connect the lift or boom portion of the vehicle with the disabled vehicle which is located not immediately behind the towing vehicle, but instead along the side of the towing vehicle. Accomplishment of this objective is achieved through moving the boom or crane to a position immediately adjacent to the disabled vehicle and then by moving or pivoting the crane to position the disabled vehicle immediately behind the towing vehicle.

SUMMARY OF THE INVENTION

One embodiment of the present invention is a vehicle for moving a load from a side to rearward of the vehicle and then for towing same comprising a vehicle frame, a telescopic boom with a proximal end pivotally mounted on the frame and with a distal end portion extendable therefrom, the boom including cable means to engage a load, lifting power means mounted on the frame and engaged with the cable means operable therewith to lift the load, extension power means mounted on the frame and engaged with the boom operable to vertically move the boom and to swing the boom with load attached from a side to rearward of the vehicle frame, an elongated support movably mounted to the frame rearwardly thereof and extending generally parallel to ground therebeneath, and support power means mounted on the frame and engaged with the elongated support operable to move the elongated support from an upward stored position down to a ground-engaging position supporting the frame as the boom is moved with the load.

It is an object of the present invention to provide a vehicle for moving a load from a side to rearward of the towing vehicle and then for towing same.

Yet another object of the present invention is to provide a new and improved towing vehicle.

In addition, it is an object of the present invention to provide a towing vehicle for lifting a disabled vehicle located aside the towing vehicle to a position immediately therebehind for subsequent towing.

Related objects and advantages of the present invention will be apparent from the following description.

BRIEF DESCRIPTION OF THE DRAWINGS

FIG. 4 is an enlarged fragmentary cross-sectional view looking in the direction of arrows 4—4 of FIG. 3.

FIG. 5 is an enlarged fragmentary cross-sectional view taken along the line 5—5 of FIG. 4 and viewed in the direction of the arrows.

FIG. 6 is an enlarged cross-sectional view taken along line 6—6 of FIG. 1 and viewed in the direction of the arrows.

DESCRIPTION OF THE PREFERRED EMBODIMENT

Figure 1:
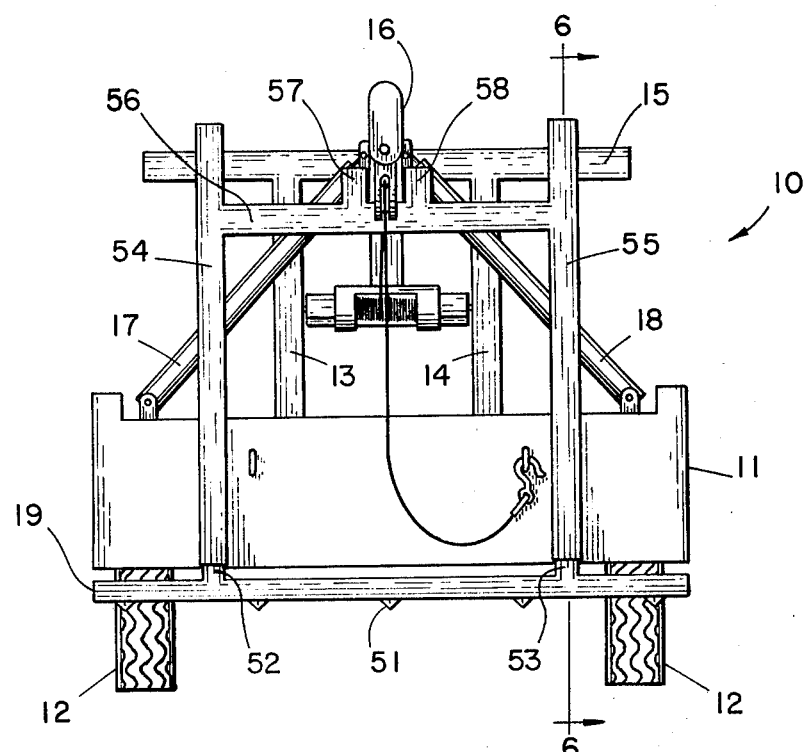
FIG. 1 is a rear view of the towing vehicle incorporating my new invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to FIG. 1, there is shown a towing vehicle having a rear bed 11 supported over a pair of rear wheels 12. Immediately adjacent the cab is a pair of upstanding posts 13 and 14 with the top ends of the posts fixedly attached to a crossbar 15 extending across the width of bed 11. A telescopically constructed boom 16 has a bottom end pivotally mounted between posts 13 and 14. The boom or crane may be moved vertically as well as sideways to either side of the truck to allow engagement with a load or disabled vehicle located along the side of the towing vehicle.

Figure 2:
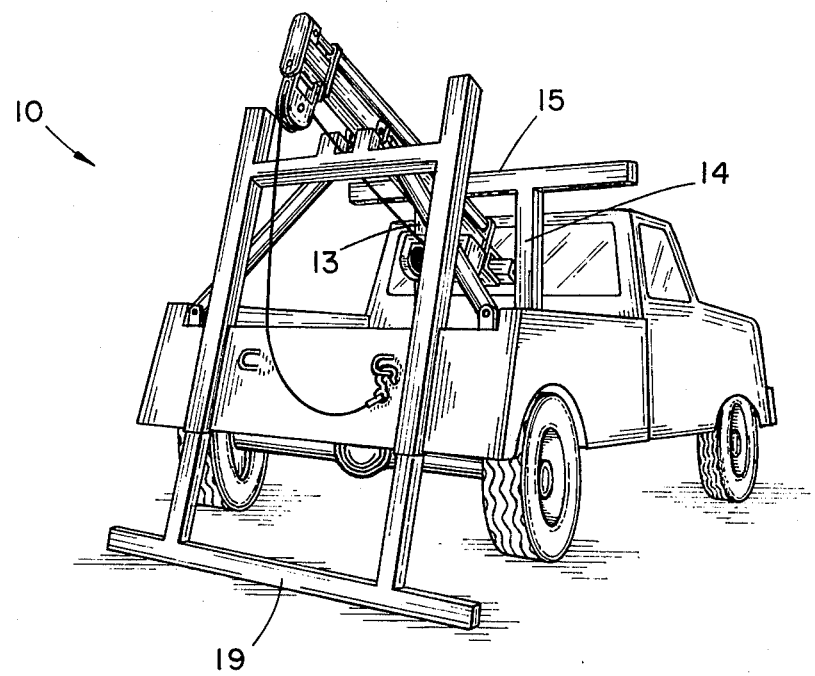
FIG. 2 is an end perspective view of the towing vehicle with the supporting means shown engaged rearwardly of the vehicle.
Figure 3:
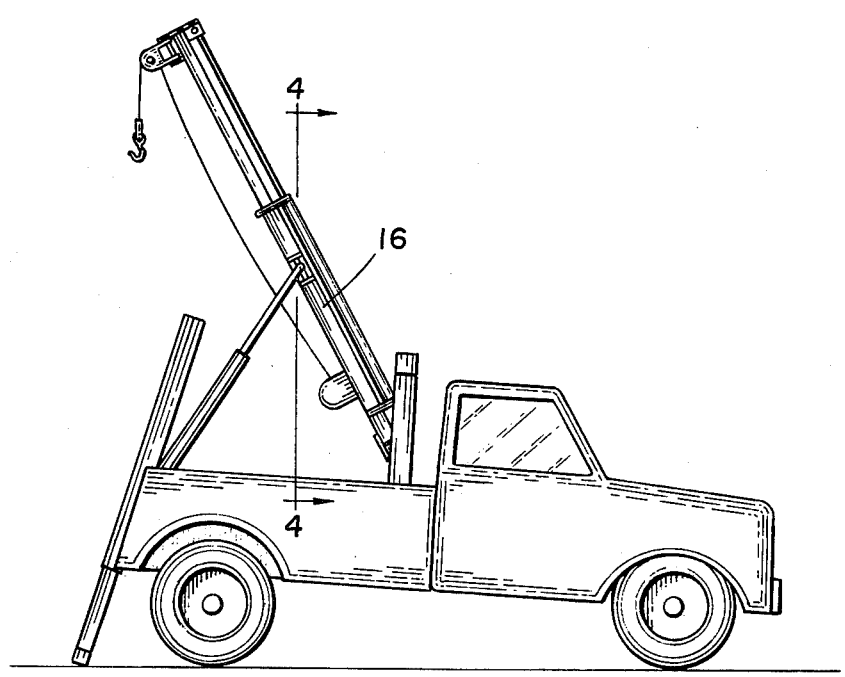
FIG. 3 is a side view of the vehicle of FIG. 2 with the boom shown in the upward center position.

A pair of cylinder motors 17 and 18 (FIG. 1) each has a bottom end pivotally mounted atop bed 11 and an extendable piston rod attached to boom 16 to facilitate the upward and sideways movement of the boom. In addition, a downwardly extendable elongated support 19 is movably mounted to the rear of the truck and may be moved from the upward position shown in FIG. 1 to the downward position shown in FIGS. 2 and 3 thereby providing proper support for the truck as the boom is moved to the side to lift the disabled vehicle toward the rear of the towing vehicle. Boom 16 has a bifurcated bottom end 20 pivotally attached by bolt 21 to elongated member 22 in turn having a pair of opposite ends 23 and 24 bearingly received by posts 13 and 14. Member 22 is rotatable about horizontal axis 25 extending through ends 23 and 24 in the direction of arrows 26. Likewise, boom 16 is pivotable about axis 27 arranged perpendicular relative to axis 25 and extending centrally through bolt 21.

Boom 16 includes housing 28 attached to the bottom bifurcated end 20 with housing 28 slidably receiving rod 29 having a top distal end attached by flange 30 to the top end 31 of a parallel extendable piston rod 32 of cylinder motor 33 fixedly attached to housing 28. Cylinder motor 33 may be hydraulically or pneumatically powered and is operable to extend and retract rod 29 which has at its top end a swivel pulley 34 receiving a line or cable 35 attached to hook 36. A motorized pulley 37 is rotatably mounted to the bottom end of housing 16 and wrappingly receives cable 35. Motorized pulley 37 is operable to allow cable 35 to be extended or retracted allowing hook 36 to be attached to the disabled vehicle.

Figure 7:
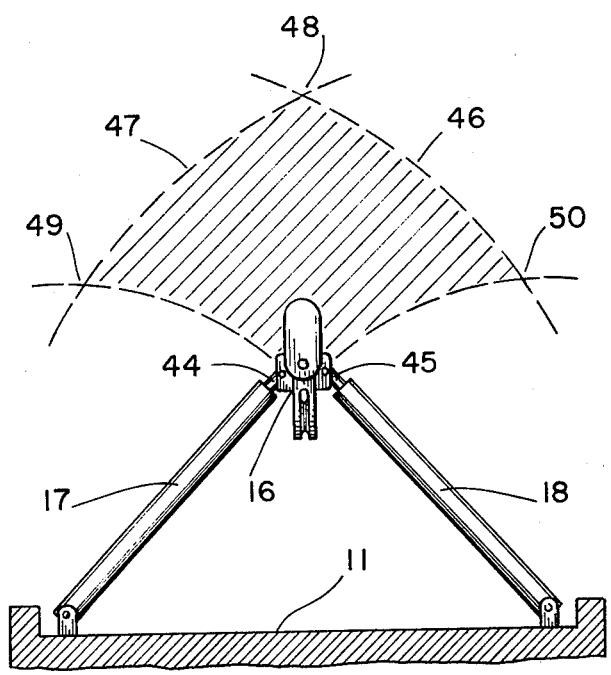
FIG. 7 is a schematic view of the range of positions of the boom and lifting means.

A first pair of flanges 40-41 and a second pair of flanges 42-43 are attached to opposite sides of housing 16 and pivotally receive the top ends, respectively, of extendable piston rods 44 and 45 slidably received by cylinder motors 17 and 18 (FIG. 1) having bottom ends pivotally attached to bed 11. Cylinder motors 17 and 18 may be hydraulically or pneumatically powered and are independently operated to allow complete extension of both rods 44 and 45 simultaneously or a variety of positions with one rod extended and the other rod retracted or various positions therebetween. For example, the boom is shown in the lowest center position relative to bed 11 in FIG. 7. Rod 44 may be extended to a maximum location 46 whereas rod 45 may be extended to a maximum position 47. With both rods 44 and 45 extended to their maximum positions, boom 16 will be located at its upward center position 48 with respect to bed 11. With rods 29 and 44 retracted and rod 45 extended to its maximum position, boom 16 will be located at position 49 whereas with rods 29 and 45 retracted and rod 44 extended to its maximum position, the boom will be located at position 50. Thus, boom 16 may be located at any area within the cross-hatched area shown in FIG. 7 with extension of rod 29 then further positioning the top end of the boom aside the vehicle enabling hook 36 to be attached to the load or disabled vehicle located aside the truck.

Elongated support 19 has a plurality of teeth 51 fixedly attached to the bottom surface of the support so as to frictionally engage the ground when support 19 is forced downwardly against the ground. Support 19 is fixedly attached to a pair of legs 52 and 53, respectively, slidably received by a pair of hollow posts 54 and 55 attached to the rear surface of bed 11. Posts 54 and 55 may be attached by any means such as welding or conventional fastening means. Posts 54 and 55 extend upwardly being fixedly attached to cross member 56 having a pair of upwardly extending and spaced apart parallel flanges 57 and 58 allowing boom 16 to be located therebetween to rest atop cross member 56 when the boom is in the lower center position for towing a vehicle. Each post 54 and 55 is provided with a hydraulic cylinder motor so as to control the downward movement of support 19. For example, post 55 includes cylinder motor 59 slidably receiving rod 53 attached to elongated support 19. The cylinder motors within posts 54 and 55 may be hydraulic or pneumatic in operation.

In order to operate the vehicle disclosed herein, the towing vehicle is first located along side the load or disabled vehicle, for example, which may in turn be positioned in a culvert or ditch aside the road supporting the towing vehicle. Cylinder motors 17 and 18 are then operated to swing the top end of the boom to the side of towing vehicle 10 allowing the hook 36 to be attached to the load by operation of the motorized pulley 37. Cylinder motor 33 is operated so as to obtain the desired height of the boom. The motorized pulley 37 is then operated to partially lift the disabled vehicle with cylinder motors 17 and 18 then being operated so as to drag or swing the load or disabled vehicle to a position immediately behind the towing vehicle. The disabled vehicle may then be towed in a conventional style.

Prior to attaching the disabled vehicle to hook 36, the cylinder motors within posts 54 and 55 are operated to force elongated support 19 downwardly against the ground thereby providing stability for the towing vehicle as lifting force is applied to the disabled vehicle. Elongated support 19 is moved upwardly after the disabled vehicle is swung to a position behind the towing vehicle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A vehicle for moving a load from side to rearward of the vehicle and then for towing same comprising:
    a vehicle frame;
    a telescopic boom with a proximal end pivotally mounted on said frame and with a distal end portion extendable therefrom, said boom including cable means to engage a load;
    lifting power means mounted on said frame and engaged with said cable means operable therewith to lift said load;
    extension power means including a pair of power cylinders mounted on said frame and converging from opposite sides of said frame to attachment at said boom and operable to vertically move said boom and to swing said boom with load attached from a side to rearward of said vehicle frame;
    a pair of hollow spaced-apart and parallel tubes fixedly mounted rearwardly to said frame and a pair of rods slidably mounted to said tubes and extendable downwardly therefrom;
    an elongated support extending generally parallel to ground beneath the support and attached to and extending between said rods;
    support power means attached to at least one of said tubes and at least one of said rods to effect slidable motion therebetween to move said elongated support from an upward stored position down to a ground-engaging position supporting said frame as said boom is moved with said load;
    a resting bar extending between and affixed to said tubes and including a pair of upwardly extending spaced apart flanges located centrally on said resting bar providing a rest to support said boom when in lowered position to tow a vehicle.

2. The vehicle of claim 1 wherein said power cylinders each have a bottom end pivotally mounted to said frame and an extendable cylinder rod pivotally attached to said boom.

3. The vehicle of claim 2 wherein said lifting power means includes a power cylinder mounted externally to said boom which includes a swivel pulley wheel mounted at said distal end position receiving said cable means.

4. A vehicle for moving a load from side to rearward of the vehicle and then for towing same comprising:
    a vehicle frame;
    a telescoping boom pivotally mounted on said frame about a horizontal axis and a second axis perpendicular to said horizontal axis;
    a power cylinder mounted externally to said boom and extending generally parallel thereto for extension and retraction of the boom;
    a further pair of power cylinders pivotally mounted at the rear of said frame and extending convergingly upwardly and forwardly to pivotal attachment with said boom operable to control vertical and sideward movement of the boom; and a resting bar mounted to and above said frame having means to support said boom when attached to a load with said power cylinders retracted.

5. The vehicle of claim 4 further including:

an elongated support movably mounted to said frame and engageable with the ground to support said boom.

6. The vehicle of claim 5 in which support power means is provided for lifting said elongated support out of engagement with the ground prior to towing movement of the vehicle.

* * * * *